US009342581B2

(12) United States Patent
Goertz

(10) Patent No.: US 9,342,581 B2
(45) Date of Patent: *May 17, 2016

(54) SYSTEM TO DISCLOSE THE INTERNAL STRUCTURE OF PERSISTENT DATABASE OBJECTS

(75) Inventor: Peter Goertz, Durmersheim (DE)

(73) Assignee: SAP SE, Walldorf (DE)

( * ) Notice: Subject to any disclaimer, the term of this patent is extended or adjusted under 35 U.S.C. 154(b) by 903 days.

This patent is subject to a terminal disclaimer.

(21) Appl. No.: 13/110,440

(22) Filed: May 18, 2011

(65) Prior Publication Data
US 2011/0282912 A1 Nov. 17, 2011

Related U.S. Application Data

(63) Continuation of application No. 11/394,850, filed on Mar. 31, 2006, now Pat. No. 7,958,501.

(51) Int. Cl.
G06F 17/30 (2006.01)
G06F 9/44 (2006.01)

(52) U.S. Cl.
CPC ........ *G06F 17/30607* (2013.01); *G06F 9/4435* (2013.01); *G06F 17/30312* (2013.01)

(58) Field of Classification Search
CPC ............... G06F 17/30607; G06F 17/30312; G06F 9/4435
See application file for complete search history.

(56) References Cited

U.S. PATENT DOCUMENTS

| | | | |
|---|---|---|---|
| 5,761,671 A * | 6/1998 | Blackman et al. | 707/763 |
| 5,815,415 A | 9/1998 | Bentley et al. | |
| 6,192,370 B1 * | 2/2001 | Primsch | |
| 6,397,384 B1 * | 5/2002 | Briggs | 717/165 |
| 6,769,124 B1 * | 7/2004 | Schoening et al. | 719/316 |
| 7,653,651 B1 | 1/2010 | Pavlov | |
| 2002/0073061 A1 * | 6/2002 | Collins | 701/1 |
| 2003/0088576 A1 * | 5/2003 | Hattori et al. | 707/103 R |
| 2005/0177579 A1 | 8/2005 | Blakeley et al. | |
| 2006/0048097 A1 | 3/2006 | Doshi | |
| 2007/0255750 A1 | 11/2007 | Goertz | |
| 2007/0294282 A1 * | 12/2007 | Cruver | 707/102 |

FOREIGN PATENT DOCUMENTS

WO 00/14656 A1 3/2000

OTHER PUBLICATIONS

"Non-Final Office Action" mailed May 14, 2008, for U.S. Appl. No. 11/394,850, entitled "System to Disclose the Internal Structure of Persistent Database Objects", filed Mar. 31, 2006, 16pgs.

(Continued)

*Primary Examiner* — Daniel Kinsaul
(74) *Attorney, Agent, or Firm* — Buckley, Maschoff & Talwalkar LLC

(57) ABSTRACT

A system may provide generation of a file to declare one or more persistent classes, the file formatted according to a markup language syntax, and generation, based on the file, of code of an object-oriented language to declare the one or more persistent classes and to describe a structure of each of the one or more persistent classes. Further aspects may include calling a constructor to register an interface to a description of a persistent class, accessing the registered interface to determine the structure of the persistent class, and processing an instance of the persistent class based on the determined structure.

21 Claims, 14 Drawing Sheets

(56) References Cited

OTHER PUBLICATIONS

"Final Office Action" mailed Sep. 29, 2008, for U.S. Appl. No. 11/394,850, entitled "System to Disclose the Internal Structure of Persistent Database Objects", filed Mar. 31, 2006, 12pgs.

"Non-Final Office Action" mailed Feb. 4, 2009, for U.S. Appl. No. 11/394,850, entitled "System to Disclose the Internal Structure of Persistent Database Objects", filed Mar. 31, 2006, 11pgs.

"Final Office Action" mailed May 27, 2009, for U.S. Appl. No. 11/394,850, entitled "System to Disclose the Internal Structure of Persistent Database Objects", filed Mar. 31, 2006, 12pgs.

"Final Office Action" mailed Sep. 1, 2009, for U.S. Appl. No. 11/394,850, entitled "System to Disclose the Internal Structure of Persistent Database Objects", filed Mar. 31, 2006, 13pgs.

"Final Office Action" mailed Sep. 30, 2009, for U.S. Appl. No. 11/394,850, entitled "System to Disclose the Internal Structure of Persistent Database Objects", filed Mar. 31, 2006, 14pgs.

"Non-Final Office Action" mailed Mar. 26, 2010, for U.S. Appl. No. 11/394,850, entitled "System to Disclose the Internal Structure of Persistent Database Objects", filed Mar. 31, 2006, 17pgs.

"Final Office Action" mailed Jul. 16, 2010, for U.S. Appl. No. 11/394,850, entitled "System to Disclose the Internal Structure of Persistent Database Objects", filed Mar. 31, 2006, 14pgs.

\* cited by examiner

```
<PERSCLASS NAME="MyClass" ID="MyClassID">
    <SECTION ACCESSTYPE="public">
        <CPP STRING="MyClass() {};"/>
        <CPP STRING="~MyClass() {};"/>
        <CPP STRING="void          setI(OmsTypeInt4 i) {m_I = i;}"/>
        <CPP STRING="OmsTypeInt4   getI() const {return m_I;}"/>
        <CPP STRING="void          setC1(OmsTypeChar c) {m_C1 = c;}"/>
        <CPP STRING="OmsTypeChar getC1() const {return m_C1;}"/>
        <CPP STRING="void          setC2(OmsTypeChar c) {m_C2 = c;}"/>
        <CPP STRING="OmsTypeChar getC2() const {return m_C2;}"/>
        <CPP STRING="void          setC3(OmsTypeChar c) {m_C3 = c;}"/>
        <CPP STRING="OmsTypeChar getC3() const {return m_C3;}"/>
        <CPP STRING="void          setC4(OmsTypeChar c) {m_C4 = c;}"/>
        <CPP STRING="OmsTypeChar getC4() const {return m_C4;}"/>
    </SECTION>
    <SECTION ACCESSTYPE="private"/>
        <CLASSMEMBER NAME="m_I"  TYPE="OmsTypeInt4"/>
        <CLASSMEMBER NAME="m_C1" TYPE="OmsTypeChar"/>
        <CLASSMEMBER NAME="m_C2" TYPE="OmsTypeChar "/>
        <CLASSMEMBER NAME="m_C3" TYPE="OmsTypeChar "/>
        <CLASSMEMBER NAME="m_C4" TYPE="OmsTypeChar "/>
    </SECTION>
    <SIZE VALUE="12"/>
</PERSCLASS>
```

FIG. 6

```
class X2DC_PersClass_ID1_Desc : public X2DC_PersClass
{
public:
    int         PersistentSize() {return 16;}
    int         Alignment() {return 4;}
    X2DC_MemDesc_Iterator FirstMember();
private:
    static X2DC_MemDesc X2DC_ClassMember[5+1];
};
```
⎫
⎬ 710
⎭

```
X2DC_MemDesc X2DC_PersClass_ID1_Desc::X2DC_ClassMember[5+1] =
{ //             Member          Level   Type    PC_ID   Dim     Size Align
                                                                              Offset
X2DC_MemDesc( (char*)"m_I",      1,      3,      0,      1,      4,      4,   8
    ),
X2DC_MemDesc( (char*)"m_C1",     1,      201,    0,      1,      1,      1,   12
    ),
X2DC_MemDesc( (char*)"m_C2",     1,      201,    0,      1,      1,      1,   13
    ),
X2DC_MemDesc( (char*)"m_C3",     1,      201,    0,      1,      1,      1,   14
    ),
X2DC_MemDesc( (char*)"m_C4",     1,      201,    0,      1,      1,      1,   15
    ),
X2DC_MemDesc( )
}
```
⎫
⎬ 720
⎭

FIG. 7

```xml
<?xml version="1.0" encoding="ISO-8859-1" standalone="yes" ?>
    <CLASSES  xmlns="CppApplInterface"
             xmlns:xsi="http://www.w3.org/2001/XMLSchema-instance">

<IMPORT FILE="livecachetypes.xml">
    </IMPORT>

<IMPORT FILE="MySecondFile.xml">
    </IMPORT>

<CONST NAME="MyClassID"  TYPE="OmsTypeInt4!" NUMBER="1">
    </CONST>

<PERSCLASS NAME="MyClass" ID="MyClassID">
        <SECTION ACCESSTYPE="public">
            <CPP STRING="MyClass() {};"/>
            <CPP STRING="~MyClass() {};"/>
            <CPP STRING="void         setI(OmsTypeInt4 i) {m_I = i;}"/>
            <CPP STRING="OmsTypeInt4  getI() const {return m_I;}"/>
            <CPP STRING="void         setC1(OmsTypeChar c) {m_C1 = c;}"/>
            <CPP STRING="OmsTypeChar getC1() const {return m_C1;}"/>
            <CPP STRING="void         setC2(OmsTypeChar c) {m_C2 = c;}"/>
            <CPP STRING="OmsTypeChar getC2() const {return m_C2;}"/>
            <CPP STRING="void         setC3(OmsTypeChar c) {m_C3 = c;}"/>
            <CPP STRING="OmsTypeChar getC3() const {return m_C3;}"/>
            <CPP STRING="void         setC4(OmsTypeChar c) {m_C4 = c;}"/>
            <CPP STRING="OmsTypeChar getC4() const {return m_C4;}"/>
        </SECTION>
        <SECTION ACCESSTYPE="private"/>
            <CLASSMEMBER NAME="m_I"   TYPE="OmsTypeInt4"/>
            <CLASSMEMBER NAME="m_C1" TYPE="OmsTypeChar"/>
            <CLASSMEMBER NAME="m_C2" TYPE="OmsTypeChar "/>
            <CLASSMEMBER NAME="m_C3" TYPE="OmsTypeChar "/>
            <CLASSMEMBER NAME="m_C4" TYPE="OmsTypeChar "/>
             <CLASSMEMBER NAME="m_MS" TYPE="MyStruct"/>
        </SECTION>
        <SIZE VALUE="20"/>
    </PERSCLASS>
    </CLASSES>
```

FIG. 9

```xml
<?xml version="1.0" encoding="ISO-8859-1" standalone="yes" ?>
   <CLASSES xmlns="CppApplInterface"
             xmlns:xsi="http://www.w3.org/2001/XMLSchema-instance">

<IMPORT FILE="livecachetypes.xml">
   </IMPORT>

<STRUCT NAME="MyStruct">
      <MEMBER NAME="m1" TYPE="OmsTypeInt4"/>
      <MEMBER NAME="m2" TYPE="OmsTypeInt4"/>
   </STRUCT>

</CLASSES>
```

FIG. 10

```xml
<?xml version="1.0" encoding="ISO-8859-1" standalone="yes" ?>
<CLASSES xmlns="CppAppInterface"
         xmlns:xsi="http://www.w3.org/2001/XMLSchema-instance">

<IMPORT FILE="livecachetypes.xml">
........... relevant content of livecachetypes.xml ...............
</IMPORT>

<IMPORT FILE="MySecondFile.xml">

<STRUCT NAME="MyStruct">
    <MEMBER NAME="m1" TYPE="OmsTypeInt4"/>
    <MEMBER NAME="m2" TYPE="OmsTypeInt4"/>
</STRUCT>

</IMPORT>
        <PERSCLASS NAME="MyClass" ID="MyClassID">
        <SECTION ACCESSTYPE="public">
            <CPP STRING="MyClass() {};"/>
            <CPP STRING="~MyClass() {};"/>
            <CPP STRING="void         setI(OmsTypeInt4 i) {m_I = i;}"/>
            <CPP STRING="OmsTypeInt4  getI() const {return m_I;}"/>
            <CPP STRING="void         setC1(OmsTypeChar c) {m_C1 = c;}"/>
            <CPP STRING="OmsTypeChar getC1() const {return m_C1;}"/>
            <CPP STRING="void         setC2(OmsTypeChar c) {m_C2 = c;}"/>
            <CPP STRING="OmsTypeChar getC2() const {return m_C2;}"/>
            <CPP STRING="void         setC3(OmsTypeChar c) {m_C3 = c;}"/>
            <CPP STRING="OmsTypeChar getC3() const {return m_C3;}"/>
            <CPP STRING="void         setC4(OmsTypeChar c) {m_C4 = c;}"/>
            <CPP STRING="OmsTypeChar getC4() const {return m_C4;}"/>
        </SECTION>
        <SECTION ACCESSTYPE="private"/>
            <CLASSMEMBER NAME="m_I"  TYPE="OmsTypeInt4"/>
            <CLASSMEMBER NAME="m_C1" TYPE="OmsTypeChar"/>
            <CLASSMEMBER NAME="m_C2" TYPE="OmsTypeChar "/>
            <CLASSMEMBER NAME="m_C3" TYPE="OmsTypeChar "/>
            <CLASSMEMBER NAME="m_C4" TYPE="OmsTypeChar "/>
            <CLASSMEMBER NAME="m_MS" TYPE="MyStruct"/>
        </SECTION>
        <SIZE VALUE="20"/>
</PERSCLASS>
</CLASSES>
```

FIG. 11

```
                                                    ┌─1200
#ifndef MyFile__H
define MyFile__H include "livecachepcif.h"
include "livecache.h"
#include "livecachetypes.h"
#include "MySecondFile.h"

#define MyClassID ( 1 )

class MyClass: public OmsObject< MyClass, MyClassID >
{
public:
    MyClass() {};
    MyClass(X2DC_ClassID id);
    ~MyClass() {};
    void          setI(OmsTypeInt4 i) {m_I = i;}
    OmsTypeInt4   getI() const {return m_I;}
    void          setC1(OmsTypeChar c) {m_C1 = c;}
    OmsTypeChar   getC1() const {return m_C1;}
    void          setC2(OmsTypeChar c) {m_C2 = c;}
    OmsTypeChar   getC2() const {return m_C2;}
    void          setC3(OmsTypeChar c) {m_C3 = c;}
    OmsTypeChar   getC3() const {return m_C3;}
    void          setC4(OmsTypeChar c) {m_C4 = c;}
    OmsTypeChar   getC4() const {return m_C4;}
    MyStruct      m_MS;
private:
    OmsTypeInt4   m_I;
    OmsTypeChar   m_C1;
    OmsTypeChar   m_C2;
    OmsTypeChar   m_C3;
    OmsTypeChar   m_C4;
};
#endif
```

FIG. 12

```
class X2DC_MemDesc
{                                              ┌─1300
public:
        inline X2DC_MemDesc();
        inline X2DC_MemDesc(char * pName);
        inline X2DC_MemDesc( char * pName, int Level, int Type, int ClassID,
                        int Dimension, int Size, int Alignment, int Offset );
        ~X2DC_MemDesc() {};
        const char *  getName() const {return m_pName;}
        int           getLevel() const {return m_Level;}
        int           getType() const {return m_Type;}
        int           getClassID() const {return m_ClassID;}
        int           getDimension() const {return m_Dimension;}
        int           getSize() const {return m_Size;}
        int           getAlignment() const {return m_Alignment;}
        int           getOffset() const {return m_Offset;}
private:
        char *     m_pName;
        int   m_Level;
        int   m_Type;
        int   m_ClassID;
        int   m_Dimension;
        int   m_Size;
        int   m_Alignment;
        int   m_Offset;
}

┌─1350
class X2DC_MemDesc_Iterator
{
public:
        inline X2DC_MemDesc_Iterator(X2DC_MemDesc * pDesc);
        ~X2DC_MemDesc_Iterator() {};
        inline bool Next();
        inline bool Down();
        inline bool Up();
        void Reset() { m_pCurrent = m_pFirst; m_pRunner = NULL; }
        inline const X2DC_MemDesc * operator()() const;
private:
        bool isFirst(X2DC_MemDesc * pDesc) {return (pDesc == m_pFirst);}
        bool isLast(X2DC_MemDesc * pDesc) {return (pDesc == m_pLast);}
        X2DC_MemDesc *  m_pFirst;
        X2DC_MemDesc *  m_pLast;
        X2DC_MemDesc *  m_pCurrent;
        X2DC_MemDesc *  m_pRunner;
        bool            m_OK;
}
```

FIG. 13

```
class X2DC_PersClass_ID1_Desc : public X2DC_PersClass
{
public:
    int         PersistentSize() {return 16;}
    int         Alignment() {return 4;}
    X2DC_MemDesc_Iterator FirstMember();
private:
    static X2DC_MemDesc X2DC_ClassMember[8+1];
};
```
⎫
⎬ 1410
⎭

1400

```
X2DC_MemDesc X2DC_PersClass_ID1_Desc::X2DC_ClassMember[8+1] =
{ //              Member        Level   Type    PC_ID   Dim    Size   Align   Offset
  X2DC_MemDesc( (char*)"m_MS",     1,    214,     0,     1,     8,     4,      0   ),
  X2DC_MemDesc( (char*)"m_MS.m1",  2,      3,     0,     1,     4,     4,      0   ),
  X2DC_MemDesc( (char*)"m_MS.m1",  2,      3,     0,     1,     4,     4,      4   ),
  X2DC_MemDesc( (char*)"m_I",      1,      3,     0,     1,     4,     4,      8   ),
  X2DC_MemDesc( (char*)"m_C1",     1,    201,     0,     1,     1,     1,     12   ),
  X2DC_MemDesc( (char*)"m_C2",     1,    201,     0,     1,     1,     1,     13   ),
  X2DC_MemDesc( (char*)"m_C3",     1,    201,     0,     1,     1,     1,     14   ),
  X2DC_MemDesc( (char*)"m_C4",     1,    201,     0,     1,     1,     1,     15   ),
  X2DC_MemDesc( )
}
```

SYSTEM TO DISCLOSE THE INTERNAL STRUCTURE OF PERSISTENT DATABASE OBJECTS

CROSS-REFERENCE TO RELATED APPLICATION

This is a continuation of co-pending prior U.S. patent application Ser. No. 11/394,850 entitled "SYSTEM TO DISCLOSE THE INTERNAL STRUCTURE OF PERSISTENT DATABASE OBJECTS", filed Mar. 31, 2006, which application is incorporated herein by reference.

FIELD

Some embodiments relate to systems for managing database objects. In particular, some embodiments are associated with systems to store persistent database objects.

BACKGROUND

Conventional database systems operate in conjunction with data stored in relational database tables. A data cache may also be provided for storing copies of some or all of the data within instances of object-oriented (e.g., C++) classes. Such instances may be referred to as database objects, and may be stored persistently according to some conventional database systems. An object-oriented class whose instances are stored persistently is called a persistent class, and a persistent database object is an instance of a persistent class.

An SAP liveCache® database instance may provide a data cache of persistent database objects as described above. Such database objects are managed by an Object Management System (OMS). OMS may be implemented as an object-oriented library (i.e., liboms) that is linked to the liveCache kernel. FIG. 1 illustrates elements of conventional liveCache database instance 100.

Application logic is written in object-oriented code and built into application libraries 110 against OMS liboms 120 and kernel 130. Libraries 110 contain routines that may be called as database procedures by external workprocesses. Application libraries 110, OMS liboms 120, and kernel 130 may comprise single "executable" 140 that executes within a common address space.

The routines provided by application libraries 110 create persistent classes and instances (i.e. persistent database objects) thereof. The persistent database objects are stored in database 150 within class-specific object containers 152. As shown in FIG. 1, database 150 may also store Structured Query Language (SQL) data 154 to be accessed by executable 140.

Application libraries 110 include object-oriented header files describing the internal structure of each persistent class represented in object containers 152. Application libraries 110 use the header files to create persistent database objects for storage in object containers 152 and to extract appropriate data from a persistent database object that is retrieved from containers 152 by kernel 130 and OMS 120.

OMS 120 and kernel 130, however, are aware only of a location and size of each persistent database object within object containers 152. As a result, OMS 120 and kernel 130 are unable to query object containers 152 based on content or perform database management functions that require knowledge of the internal structure of the stored database objects. Such functions include, but are not limited to, defining indexes associated with database object members, verifying referential integrity within the database objects, and compressing data storage based on database object members that contain default data values.

BRIEF DESCRIPTION OF THE DRAWINGS

FIG. 6 comprises a file to declare one or more persistent classes formatted according to a markup language syntax according to some embodiments.

FIG. 7 comprises object-oriented language code to declare one or more persistent classes and to describe an internal structure of each of the one or more persistent classes according to some embodiments.

FIG. 9 shows an XML file.

FIG. 10 shows an XML file.

FIG. 11 shows an XML file according to some embodiments.

FIG. 12 illustrates a header file according to some embodiments.

FIG. 13 shows declarations.

FIG. 14 illustrates C++ code.

DETAILED DESCRIPTION

Figure 2:
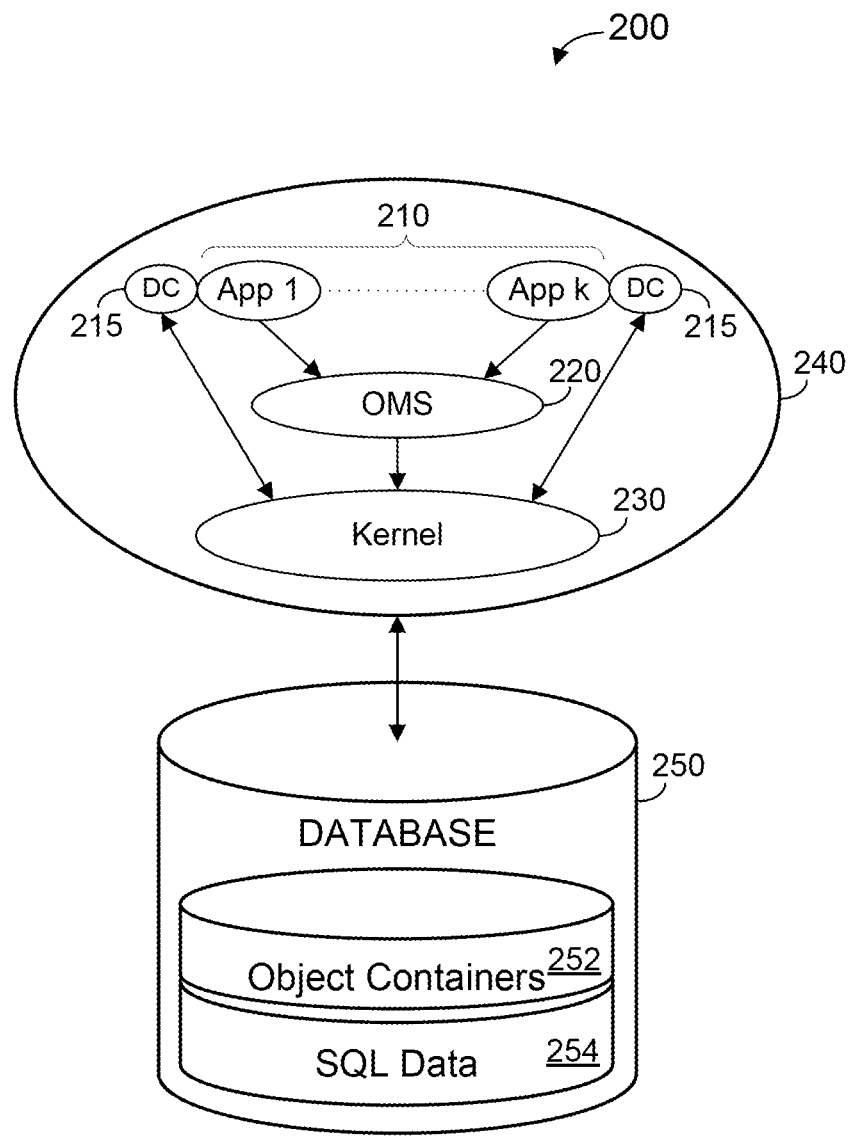
FIG. 2 is a block diagram of a conventional object-oriented database instance according to some embodiments.

FIG. 2 illustrates elements of database instance 200 for managing persistent database objects according to some embodiments. Database instance 200 comprises executable 240 and database 250. Executable 240 may comprise any system for managing a database instance that is or becomes known. Generally, executable 240 may receive SQL requests or database procedure calls, may retrieve data from database 250 based on the requests and calls, and may return the data to the requestor. Executable 240 may also perform management, optimization, monitoring and other database-related tasks.

Executable 240 comprises application libraries 210, disclosure code 215 associated with one or more of application libraries 210, OMS 220, and kernel 230, while database 250 comprises object containers 252 and SQL data 254. Some embodiments of database instance 200 may provide OMS 220 and kernel 230 with knowledge of the internal structure of persistent classes of which instances thereof (i.e., persistent database objects) are created or stored in object containers 252.

Database instance 200 may be implemented using any suitable software, hardware or firmware that is or becomes known. In some embodiments, database instance 200 resides on a hardware server, with executable 240 comprising program code executed by one or more processors of the hardware server and database 250 residing on a hard disk coupled to the hardware server. Two or more of the elements of instance 200 may be located remote from one another and may communicate with one another via a computer network and/or a dedicated connection.

Application libraries 210 may be built from object-oriented code to provide application logic to external workprocesses. Object-oriented code (e.g., C++) may be particularly suitable for implementing time-critical logic (e.g., demand-planning, time-series, etc). The application logic may process data stored in object containers 252 and SQL data 254.

Figure 1:
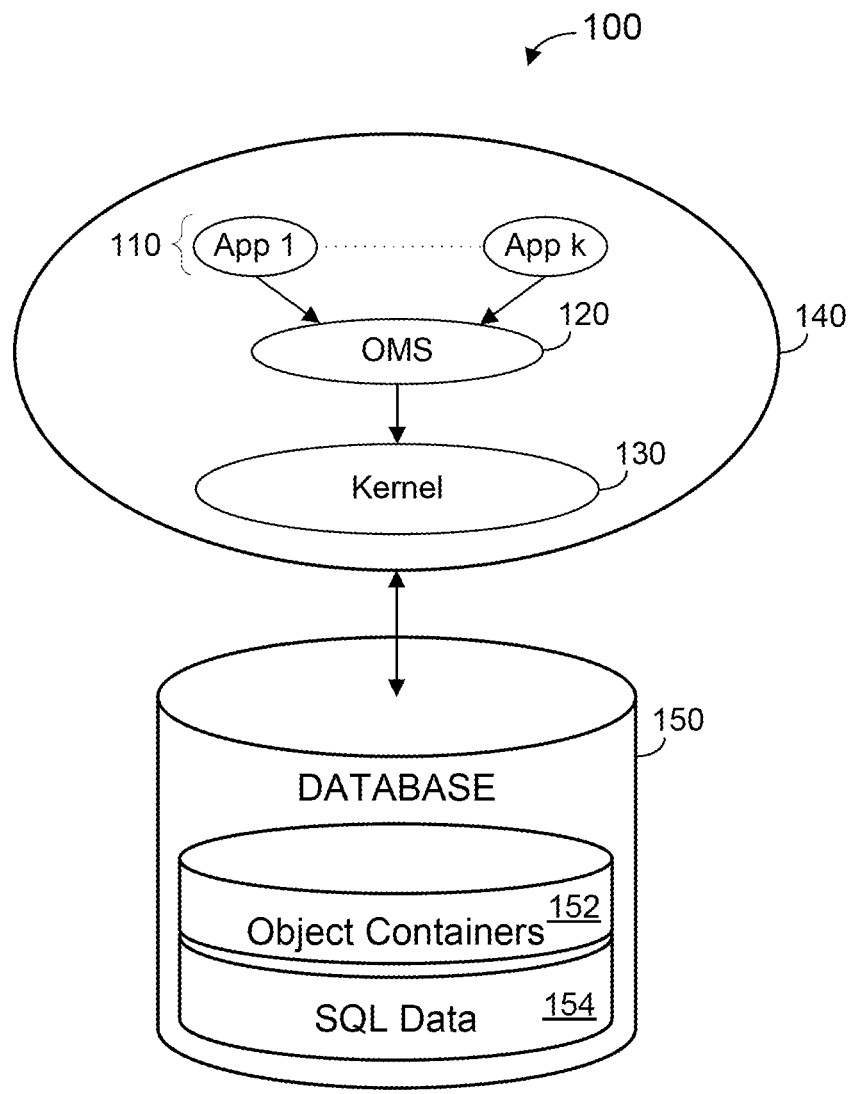
FIG. 1 is a block diagram of a conventional object-oriented database instance.

As described with respect to FIG. 1, application libraries 210 may use object-oriented header files to create persistent classes for implementing the application logic. The header files describe the internal structure of each persistent class represented in object containers 252.

According to some embodiments, a C++ class becomes a persistent class by deriving from OmsObject: class MyClass: public OmsObject<MyClass, MyClassID>. Template class OmsObject itself is derived from the base class OmsAbstractObject. The second template parameter MyClassID is an integer that uniquely identifies the class MyClass. OmsObject and OmsAbstractObject are declared in file livecache.h that is provided by the OMS.

OmsAbstractObject offers methods for treating database objects persistently. Examples of such methods include omsStore, omsDeRef, and omsLock. As indicated by their naming convention, each of these methods is offered by OMS 220. The "oms" methods may be called on a database object once an instance of a persistent class is created. For example, omsStore may be called to store a database object persistently. In response, OMS 220 transfers the object to kernel 230 for storage within a container of object containers 252 that is associated with the persistent class. Each container stores persistent database objects of only one persistent class according to some embodiments.

A stored persistent database object may be returned to an application by iterating over an associated container and calling omsDeRef on each database object stored in the container. omsLock may be called to obtain exclusive change rights on a stored persistent database object.

Disclosure code 215 associated with an application library 210 may provide a description of the structure of persistent classes that are known to the application library 210. Disclosure code 215 may be accessible to kernel 230 such that kernel 230 may determine the structure of the persistent classes and of the persistent database objects which are instances thereof.

Figure 3:
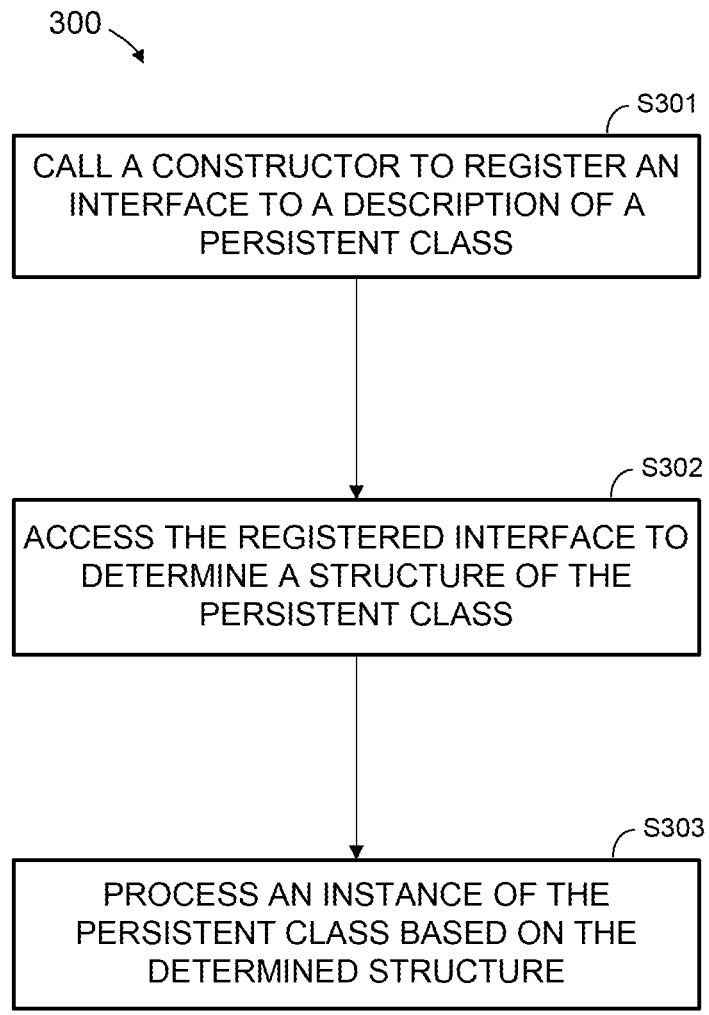
FIG. 3 is a flow diagram of a process according to some embodiments.

FIG. 3 is a flow diagram of process 300 to use disclosure code 215 according to some embodiments. Some embodiments of process 300 may be performed by a system such as database instance 200. Process 300 and all other processes mentioned herein may be embodied in processor-executable program code read from one or more of a computer-readable medium, such as a floppy disk, a CD-ROM, a DVD-ROM, a Zip™ disk, a magnetic tape, and a signal encoding the process, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Process 300 may commence after registration of all persistent classes. According to some embodiments, all persistent classes are registered upon startup of a database instance. With reference to the example of FIG. 2, each persistent class described by each of application libraries 210 is registered with OMS 220. Registration may proceed according to conventional procedures for registering persistent classes. For example, registration may include creation of a dummy instance of each persistent class in an object container of containers 252.

At step S301, a constructor is called to register an interface to a description of a persistent class. The interface is provided by disclosure code 215 that is associated with the persistent class. The interface is registered with OMS 220 and is accessible to kernel 230 as well. Details of the constructor and the interface according to some embodiments will be described below.

Next, at step S302, kernel 230 accesses the interface to determine a structure of the persistent class. For example, the interface may provide access to a static member descriptor array of the persistent class. Such an array will be described in more detail below.

An instance of the persistent class (i.e., a persistent database object) is processed based on the determined structure at step S303. The instance may be processed in any currently- or hereafter-known manner that utilizes the structure of the persistent class associated with the instance. For example, kernel 230 may define an index based on one or more members of the instance. Such an index may facilitate access to data store in the instance. A key may also be defined at step S303 based on members of the instance.

Step S303 may comprise verifying referential integrity of the instance to ensure logical consistency among instances of various classes. In some embodiments, kernel 230 uses the structure to determine that the persistent class includes a member pointing to instances of another class. Instances of the first class may then be checked to verify that the member points only to instances of the second class. Moreover, kernel 230 may also prevent deletion of a given instance of the second class as long as it is pointed to by an instance of the first class.

According to some embodiments of step S303, the determined structure allows kernel 230 to reduce storage demands on database 250. In this regard, certain members of a persistent database object may be filled with default values of their corresponding base types. Rather than storing these default values persistently, OMS 220 and kernel 230 may detect the default values and remove them before storing the object. Conversely, after reading the database object from database 250, the certain members are populated with the default values before transferring the database object to a requesting application library 210.

Figure 4:
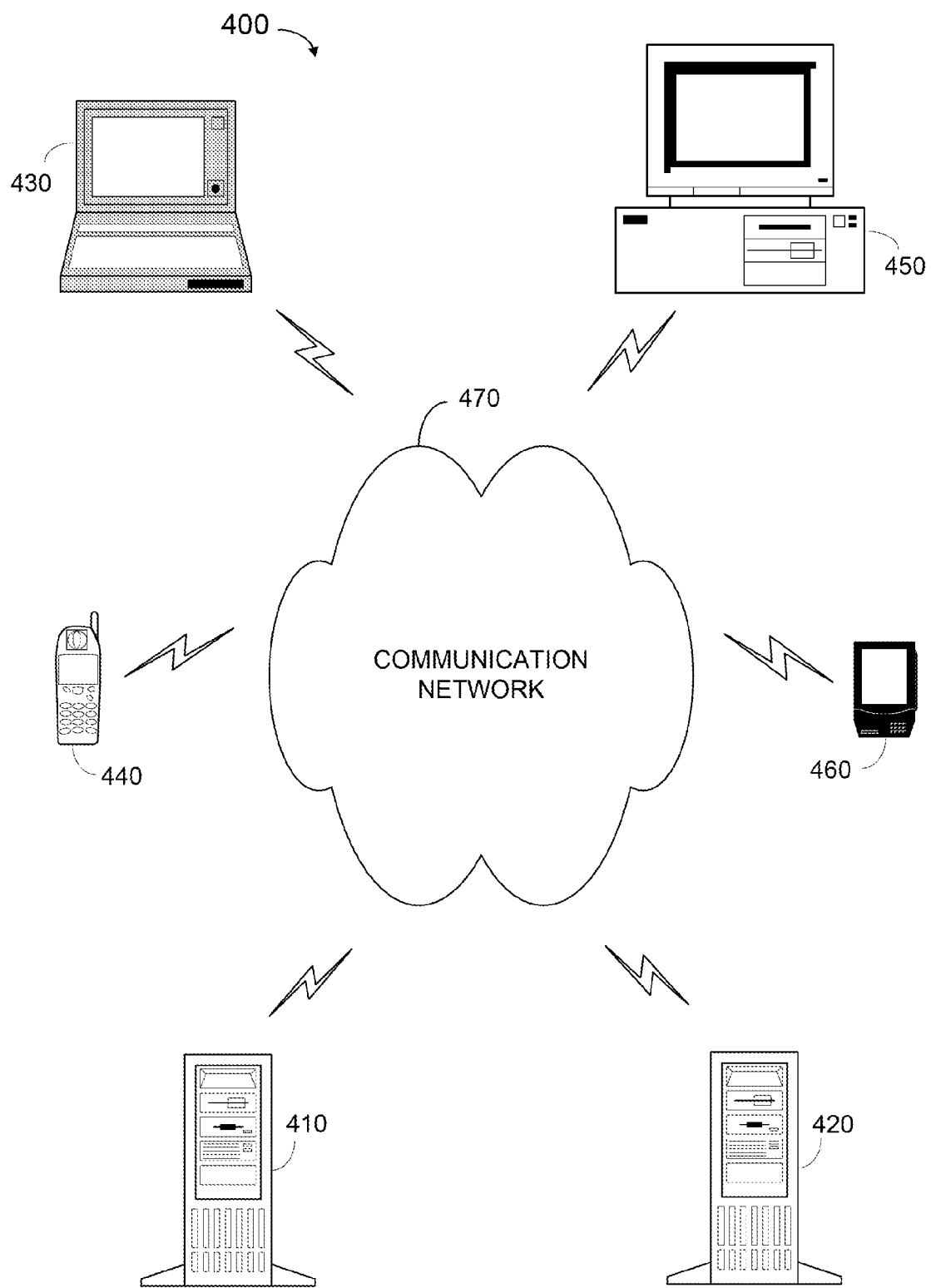
FIG. 4 is an overview of a system architecture according to some embodiments.

FIG. 4 is an overview of system architecture 400 in which process 300 may be executed according to some embodiments. Other system topologies may be used in conjunction with other embodiments.

Server 410 may operate to receive, store, manage and provide data. Server 410 may comprise a database server implementing a database management system (DBMS) and a relational database such as the SAP MaxDB™ system. Server 410 may also provide applications for receiving requests for data and for communicating with the DBMS to fulfill those requests.

Server 420 may implement a database instance such as instance 200 of FIG. 2. In this regard, server 420 may provide management of persistent database objects according to some embodiments. Such management may be implemented using application libraries, disclosure code associated with one or more of the application libraries, an OMS, a kernel, and object containers as described above.

Client devices 430, 440, 450 and 460 are illustrated as a laptop computer, a telephone, a desktop computer, and a personal digital assistant, respectively. Generally, each of client devices 430 through 460 may comprise any combination of hardware and/or software for communicating with servers 410 and 420 over communication network 470. This communication may comprise transmitting an SQL query or a database procedure call to server 410 and/or server 420, and receiving a response based on relational and/or object data stored therein.

Client devices 430 through 460 may include any suitable client application such as a Web browser or a Java applet. Server 410 may implement a Web application server to receive an SQL query or a database procedure call from such client applications. Communication network 470 may therefore comprise the Internet or an Intranet.

Communication network 470 may comprise any number of different systems for transferring data, including but not limited to a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more currently or hereafter-known transmission protocols, such as Asynchronous Transfer Mode (ATM), Internet Protocol (IP), Hypertext Transfer Protocol (HTTP) and Wireless Application Protocol (WAP). Communication network 470 may therefore comprise any communication media and protocols that are or become known.

Figure 5:
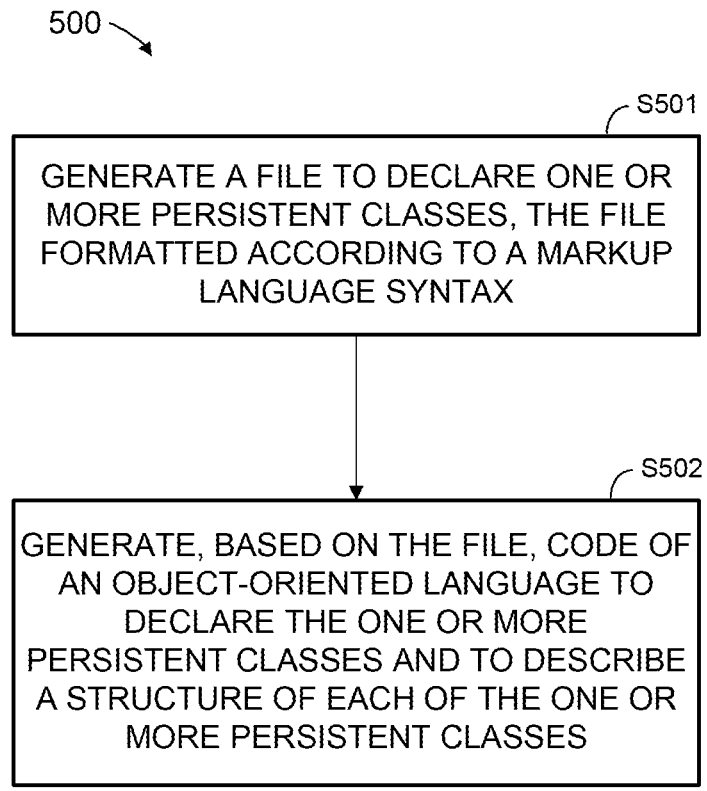
FIG. 5 is a flow diagram of a process according to some embodiments.

FIG. 5 is a flow diagram of process 500 to generate disclosure code such as disclosure code 215 according to some embodiments. Process 500 may be executed during development of an application library to which the disclosure code will be linked. In some embodiments, the disclosure code may be used by an OMS and/or a kernel to determine the structure of one or more persistent classes associated with the application library.

A file is generated at step S501. The file declares one or more persistent classes, and is formatted according to a markup language syntax. The file may be generated at step S501 using any authoring, editing or programming tools. In some embodiments, the markup language is eXtensible Markup Language (XML). Accordingly, the file complies with XML syntax.

A C++ header file is presented below to provide an example of step S501 according to some embodiments. The header file declares a persistent class but is not formatted according to a markup language syntax. In the following example, MyClassID=1 and the name of the describing class is X2DC_PersClass_ID1_Desc. The describing class will be explained in detail below.

```
class MyClass : public OmsObject< MyClass, MyClassID >
{
public:
        MyClass( ) { };
        ~MyClass( ) { };
        void           setI(OmsTypeInt4 i) {m_I = i;}
        OmsTypeInt4    getI( ) const {return m_I;}
        void           setC1(OmsTypeChar c) {m_C1 = c;}
        OmsTypeChar    getC1( ) const {return m_C1;}
        void           setC2(OmsTypeChar c) {m_C2 = c;}
        OmsTypeChar    getC2( ) const {return m_C2;}
        void           setC3(OmsTypeChar c) {m_C3 = c;}
        OmsTypeChar    getC3( ) const {return m_C3;}
        void           setC4(OmsTypeChar c) {m_C4 = c;}
        OmsTypeChar    getC4( ) const {return m_C4;}
private:
        OmsTypeInt4    m_I;
        OmsTypeChar    m_C1;
        OmsTypeChar    m_C2;
        OmsTypeChar    m_C3;
        OmsTypeChar    m_C4;
}
```

According to some embodiments using SAP liveCache, OMS header files livecache.h and livecachetypes.h are included in the above header file before the class declaration.

FIG. 6 illustrates XML file 600 to declare the above persistent class MyClass according to some embodiments of step S501. The file generated at step S501 may comply with any other suitable markup language syntax. Moreover, the tags used by the generated file may be defined by any suitable markup language schema. A schema according to some embodiments is presented below.

Next, at step S502, code of an object-oriented language is generated based on the file generated at step S501. The generated code declares the one or more persistent classes and describes a structure of each of the one or more persistent classes. In some embodiments, the generated code comprises the aforementioned disclosure code and may be used by an OMS or a DBMS kernel to determine the structure of the one or more persistent classes.

The code may be generated at step S502 by parsing the file with a code-generating parser. Such a parser may determine the size and offset of each class member based on the markup language syntax employed in the file. FIG. 7 illustrates C++ code 700 that may be generated at step S502 based on XML file 600 of FIG. 6. Code 700 includes header file 710 to declare a "disclosing class" X2DC_PersClass_ID1_Desc, and source file 720 describing a structure of the subject persistent class.

Figure 8:
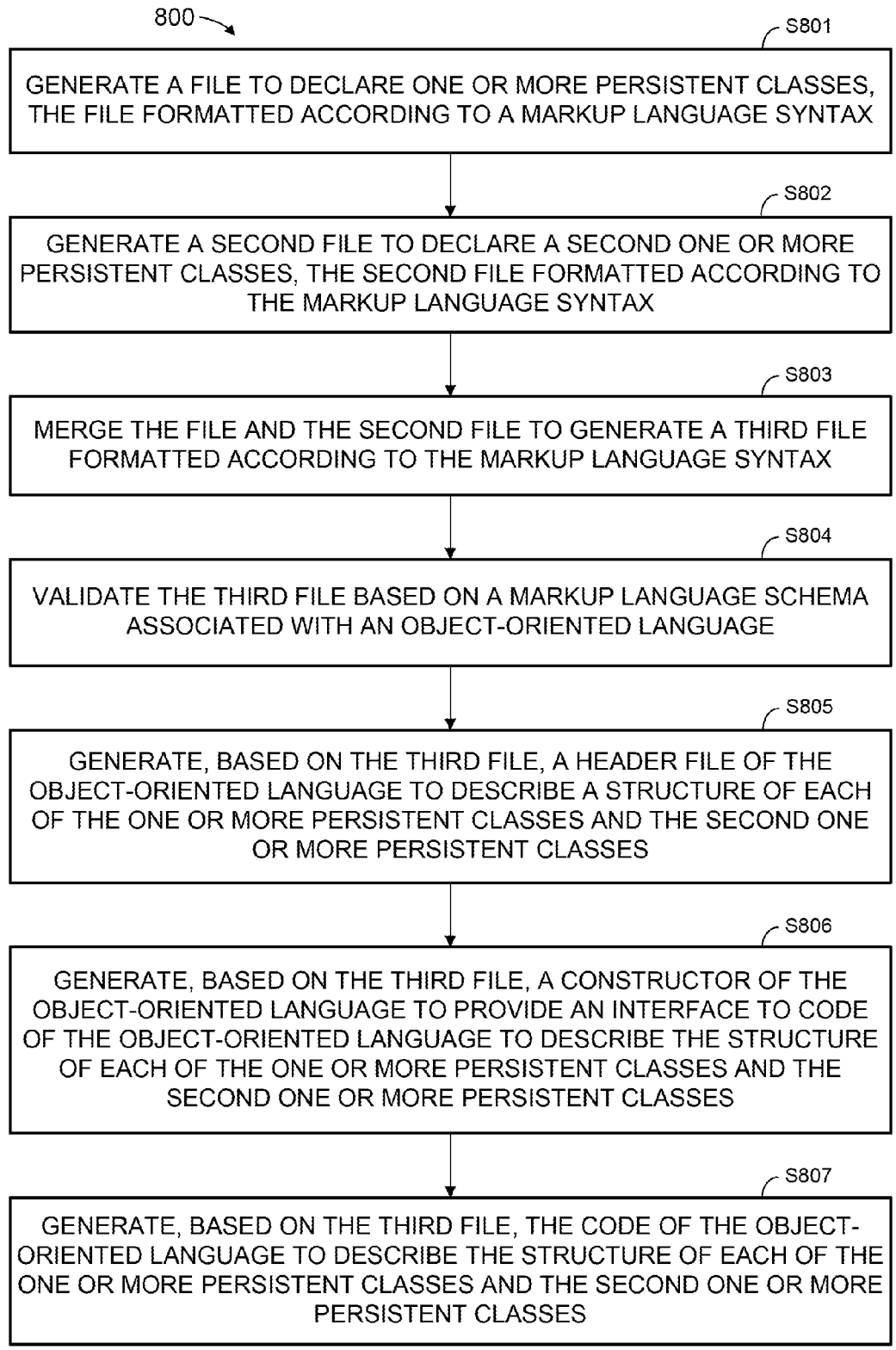
FIG. 8 is a flow diagram of a process according to some embodiments.

FIG. 8 is a detailed flow diagram of process 800 to generate code to describe a structure of a persistent class according to some embodiments. Process 800 represents one possible implementation of process 500. In this regard, a file is generated at step S801 to declare one or more persistent classes. As described with respect to step S501, the file is formatted according to a markup language syntax. A second file is generated at step S802 to declare a second one or more persistent classes. The second file is also formatted according to a markup language syntax.

For purposes of the present example, it will be assumed that XML file 900 of FIG. 9 is generated at step S801 and that XML file 1000 of FIG. 10 is generated at step S802. XML file 900 declares a persistent class similar to the class declared by XML file 600, but that also includes a sixth member m_MS of type MyStruct. The type MyStruct is declared in XML file 1000, which is referred to as MySecondFile.xml within XML file 900.

The files generated in steps S801 and S802 are merged in step S803 to generate a third file. The third file is also formatted according to the markup language syntax. The present example facilitates such merging using the tag <IMPORT FILE=" . . . xml"> directly followed by the end tag </IMPORT>. An XML file describing persistent classes may have several import tags preceding the class declarations. XML file 900, for example, includes tags for importing MySecondFile.xml (i.e., XML file 1000) and livecachetypes.xml, which is an XML formulation of livecachetypes.h mentioned above. livecachetypes.xml may contain, for example:

<TYPEDEF NAME="OmsTypeInt4" TYPE="int"/>
<TYPEDEF NAME="OmsTypeChar" TYPE="char"/>
<TYPEDEF NAME="OmsTypeInt8" TYPE="long"/> for 64-Bit Unix
<TYPEDEF NAME="OmsTypeInt8" TYPE="hyper"/> for Windows According to some embodiments of step S803, the file generated at step S801 is input to a software tool XMLMerge. The tool copies the content of the input file to the output file line by line. The name of the output file is determined by the input file name. Upon finding an <IMPORT FILE=" . . . xml"> tag, the tool copies the tag to the output file, opens the .xml file specified in the tag, copies the relevant content (i.e., no headers and footers) of the .xml file to the output file, copies the end tag </IMPORT> to the output file, and continues to traverse the input file. A file specified by <IMPORT FILE="... xml"> tag may itself contain import tags. Such tags are treated as above, thus causing stacking of file pointers.

The resulting third file is a self-contained XML file that declares all used types in XML. File 1100 of FIG. 11 is such a third file generated based on files 900 and 1000 according to some embodiments.

The third file is validated at step S804 based on a markup language schema associated with an object-oriented language. An XML schema CppClassDecl.xsd that may be used at step S804 is set forth at the end of the present Detailed Description. The XML schema CppClassDecl.xsd is associated with the C++ language and defines a set of XML tags that may be used to declare persistent classes. The third file may be validated against the XML schema at step S804 using a schema-validating XML parser.

Next, at step S805, a header file of the object-oriented language is generated based on the third file. The header file is to describe a structure of each of the one or more persistent classes and the second one or more persistent classes declared by the files generated at steps S801 and S802.

The header file is to be used within application libraries wherever a structure of one of the persistent class must be known. Accordingly, this header file may correspond to the header file that are conventionally accessible to application libraries but not to an OMS or kernel.

FIG. 12 illustrates header file 1200 generated according to some embodiments. File 1200 may be generated based on merged XML file 1100 of FIG. 11. The header file MySecondFile.h listed in header file 1200 is generated based on file 1000, which contains the C++ declaration of structure MyStruct. The included file livecachepcif.h will be described below.

A constructor of the object-oriented language is generated based on the third file at step S806. As described with respect to process 300, the constructor is to provide an interface to code of the object-oriented language. The code, in turn, is to describe a structure of each of the one or more persistent classes and the second one or more persistent classes.

A constructor generated according to the present example may be set forth as follows:

```
MyClass::MyClass(X2DC_ClassID id) {
    if (id == 1) {
        X2DC_PersClass * pIF = static_cast<X2DC_PersClass *>(new
        X2DC_PersClass_ID1_Desc);
        omsRegisterDCIF( "MyClass", 1, pIF );
    }
}
```

Again, the ID of the class is 1 according to the present example. If this value is used in a call to the constructor, the constructor registers an interface to the disclosure code in the OMS. The disclosure code is therefore given by class X2DC_PersClass_ID1_Desc, which is derived from the interface X2DC_PersClass. This interface offers access to the description of the internal structure of the persistent class and may be implemented as follows:

```
struct X2DC_PersClass
{
    virtual int                   PersistentSize( )  = 0;
    virtual int                   Alignment( )       = 0;
    virtual X2DC_MemDesc_Iterator FirstMember( )     = 0;
}
```

The header file livecachepcif.h mentioned above declares the interface X2DC_PersClass and its functionality. For example, livecachepcif.h may include declaration 1300 of FIG. 13 to describe a member of a persistent class, and declaration 1350 to declare an iterator over an array of member descriptors.

Next, at step S807, code of an object-oriented language is generated based on the file generated at step S803. The generated code is to describe a structure of each of the one or more persistent classes and the second one or more persistent classes. According to some embodiments, the generated code may be used by an OMS or a DBMS kernel to determine the structure of one of the one or more persistent classes and the second one or more persistent classes.

FIG. 14 illustrates C++ code 1400 that may be generated at step S807 based on XML file 1100. Code 1400 includes header file 1410 to declare disclosing class X2DC_PersClass_ID1_Desc, and source file 1420 describing a structure of a persistent class. Source file 1420 also implements the constructor of the persistent class.

According to some embodiments, process 800 is integrated into the C++ make process of the kernel, OMS liboms, and the application libraries. For example, the XML files may be associated with special directives in the make description files. The directives may ensure that the described XML processing takes place first, so that all generated C++ header files and source files exist when C++ compiling begins. Also, the disclosure code generated based on an XML file is linked to an application library whose description file lists the XML file.

The embodiments described herein are solely for the purpose of illustration. Those in the art will recognize other embodiments may be practiced with modifications and alterations limited only by the claims.

What is claimed is:

1. A method, comprising:
   calling a constructor to register an interface to a description of a persistent class;
   accessing the registered interface to determine an internal structure of the persistent class;
   processing an instance of the persistent class based on the determined internal structure, wherein the instance of the persistent class is a persistent database object;
   determining, based on the determined internal structure, members of the persistent database object that are filled with default values;
   storing the persistent database object in a database;
   reducing storage demands on the database by removing the default values from the persistent database object before the storing of the persistent database object in the database;
   after the storing of the persistent database object in the database, reading the persistent database object from the database; and
   after the reading of the persistent database object from the database, populating the determined members of the persistent database object with the default values of the persistent database object that were removed from the persistent database object before the storing of the persistent database object to reduce storage demands on the database.

2. The method according to claim 1, further comprising:
   registering the persistent class in an object management system, and
   wherein the interface is registered in the object management system.

3. The method according to claim 1, further comprising:
defining an index associated with one or more members of the instance based on the determined internal structure.

4. The method according to claim 1, further comprising:
defining a key associated with one or more members of the instance based on the determined internal structure.

5. The method according to claim 1, further comprising:
verifying referential integrity of the instance.

6. The method according to claim 1, wherein the populating the determined members of the persistent database object with the default values comprises:
populating the determined members of the persistent database object with the default values before transferring the persistent database object to a requesting application.

7. The method according to claim 6, further comprising:
transferring the persistent database object to the requesting application after the populating of the determined members of the persistent database object with the default values.

8. A non-transitory computer-readable medium storing program code, the program code comprising:
code to call a constructor to register an interface to a description of a persistent class;
code to access the registered interface to determine an internal structure of the persistent class;
code to process an instance of the persistent class based on the determined internal structure, wherein the instance of the persistent class is a persistent database object;
code to determine, based on the determined internal structure, members of the persistent database object that are filled with default values;
code to store the persistent database object in a database; and
code to reduce storage demands on the database by removing the default values from the persistent database object before the storing of the persistent database object in the database;
code to read the persistent database object from the database after the storing of the persistent database object in the database; and
code to, after the reading of the persistent database object from the database, populate the determined members of the persistent database object with the default values of the persistent database object that were removed from the persistent database object before the storing of the persistent database object to reduce storage demands on the database.

9. The medium according to claim 8, the program code further comprising:
code to register the persistent class in an object management system, and
wherein the interface is registered in the object management system.

10. The medium according to claim 8, the program code further comprising:
code to define an index associated with one or more members of the instance based on the determined internal structure.

11. The medium according to claim 8, the program code further comprising:
code to define a key associated with one or more members of the instance based on the determined internal structure.

12. The medium according to claim 8, the program code further comprising:
code to verify referential integrity of the instance.

13. The medium according to claim 8, wherein the code to populate the determined members of the persistent database object with the default values comprises:
code to populate the determined members of the persistent database object with the default values before transferring the persistent database object to a requesting application.

14. The medium according to claim 13, wherein the code to read the persistent database object from the database further comprising:
code to transfer the persistent database object to the requesting application after the populating of the determined members of the persistent database object with the default values.

15. A system comprising:
program code comprising:
an object management system to call a constructor to register an interface to a description of a persistent class; and
a database management system kernel to access the registered interface to determine an internal structure of the persistent class, to process an instance of the persistent class based on the determined internal structure, wherein the instance of the persistent class is a persistent database object, to determine, based on the determined internal structure, members of the persistent database object that are filled with default values, to store the persistent database object in a database, to reduce storage demands on the database by removing the default values from the persistent database object before the storing of the persistent database object in the database, to read the persistent database object from the database after the storing of the persistent database object in the database, and to, after the reading of the persistent database object from the database, populate the determined members of the persistent database object with the default values of the persistent database object that were removed from the persistent database object before the storing of the persistent database object to reduce storage demands on the database; and
at least one processor to execute the program code.

16. The system according to claim 15, the object management system to register the persistent class and the interface.

17. The system according to claim 15, the database management system kernel further to define an index associated with one or more members of the instance based on the determined internal structure.

18. The system according to claim 15, the database management system kernel further to define a key associated with one or more members of the instance based on the determined internal structure.

19. The system according to claim 15, the database management system kernel further to verify referential integrity of the instance.

20. The system according to claim 15, wherein the database management system kernel to populate the determined members of the persistent database object with the default values comprises:
a database management system kernel to populate the determined members of the persistent database object with the default values before transferring the persistent database object to a requesting application.

21. The system according to claim 20, wherein the database management system kernel to read the persistent database object from the database comprises:

a database management system kernel to transfer the persistent database object to the requesting application after the populating of the determined members of the persistent database object with the default values.

* * * * *